July 6, 1926.

A. DANCY 1,591,699

ATTACHABLE VEHICLE SPRING

Filed July 27, 1925   2 Sheets-Sheet 1

Inventor
Austin Dancy
By Alexander Dowell
Attorneys

July 6, 1926.
A. DANCY
1,591,699
ATTACHABLE VEHICLE SPRING
Filed July 27, 1925  2 Sheets-Sheet 2
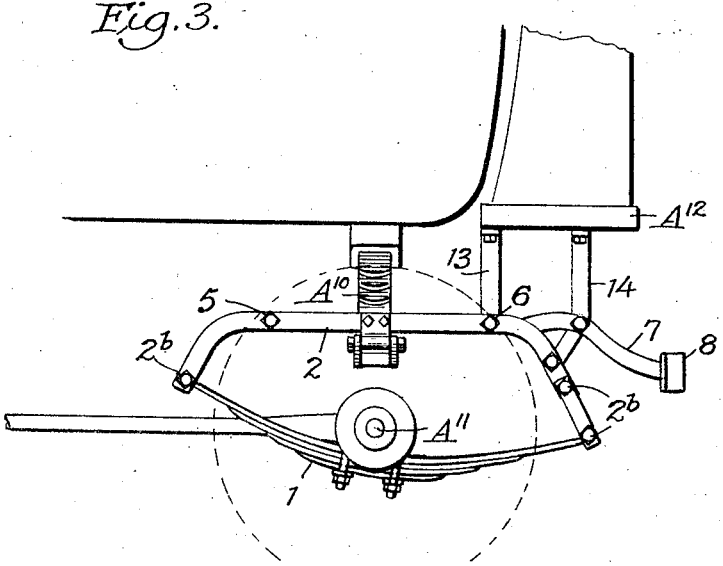
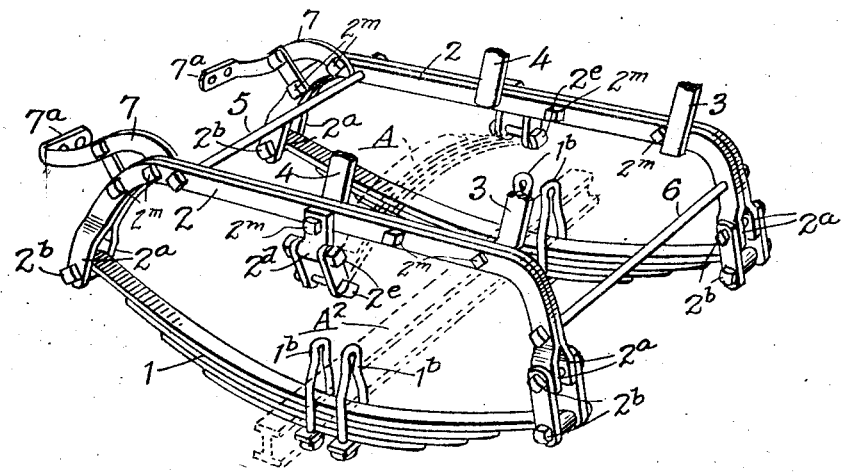
Inventor
Austin Dancy
By Alexander & Dowell
Attorneys Patented July 6, 1926.

1,591,699

UNITED STATES PATENT OFFICE.

AUSTIN DANCY, OF TARBORO, NORTH CAROLINA.

ATTACHABLE VEHICLE SPRING.

Application filed July 27, 1925. Serial No. 46,297.

This invention is a novel improvement in attachable vehicle springs for automobiles and the like, and the principal object of the invention is to provide novel, simple, and efficient attachable springs of substantially semi-elliptic shape, particularly adapted for use in connection with automobiles of the "Ford" type, said attachable springs being interposed between and connecting the outer ends of the usual transverse semi-elliptic springs with which Ford automobiles are now equipped, with axles of said vehicle, my attachable semi-elliptic springs being supported on the vehicle axles longitudinally of the vehicle, and being shackled to the outer ends of the transverse semi-elliptic springs at the front and rear ends of the vehicle, whereby the vehicle will be provided with compound springs to enhance the riding qualities thereof without weakening the axles of the vehicle, without materially raising the vehicle body with respect to the axles, and without drilling any additional holes in the axle, thereby making the Ford automobile, equipped with my springs, ride more easily, dispensing with the usual radius rods, and eliminating the danger of breaking or bending such rods which would result in causing loss of control of the vehicle.

Other minor objects of the invention will be hereinafter set forth.

I will explain the invention with reference to the accompanying drawings which illustrate one practical embodiment thereof to enable others to adopt and use the same, and will summarize in the claims the novel features of construction and novel combinations of parts for which protection is desired.

In the drawings:

Figure 3 is a side elevation of the springs attached to the rear end of the vehicle, the rear wheel at the near side being omitted to more clearly reveal the arrangement of parts.

Figure 4 is a perspective view of the attachable springs, showing in dotted lines the front axle of the vehicle and the semi-elliptic transverse body spring thereof.

Figure 1:
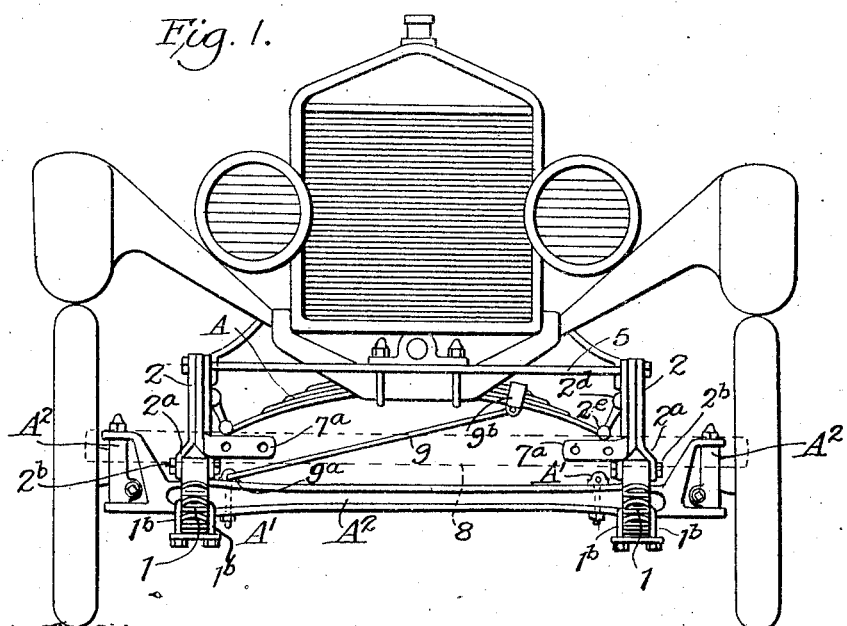
Figure 1 is an elevation of the front end of a Ford automobile equipped with my novel attachable springs.

As shown in the drawings, the usual transverse semi-elliptic spring A, at the front end of the Ford automobile is detached from its bearings A' on the front axle $A^2$ of the vehicle, which bearings are disposed adjacent the outer ends of axle $A^2$. Spring members 1, preferably comprising a plurality of leaf springs securely fastened together, are then underslung from axle $A^2$ adjacent the bearings A' and opposite the outer ends of spring A, said spring members 1 being disposed longitudinally of the vehicle, and being supported in underslung position on axle $A^2$ at substantially their mid-points, by means of straps $1^b$.

Each spring 1 is provided with a member 2, preferably bow shaped, connecting the outer ends of spring 1 above the axle $A^2$, said members 2 preferably having their outer ends bifurcated, as at $2^a$, and connected to shackles at the outer ends of spring members 1 by means of shackle bolts $2^b$, in the usual manner.

At the mid-points of the members 2, directly above axle $A^2$, are short depending straps $2^d$, which are shackled to the outer ends of the transverse semi-elliptic spring A at the front end of the "Ford" vehicle by means of shackle bolts $2^e$ whereby the outer ends of transverse spring A will be supported directly over the axle $A^2$ at a slightly higher elevation than customary, with the substantially semi-elliptic springs 1, 2, interposed between the spring A and axle $A^2$.

Figure 2:
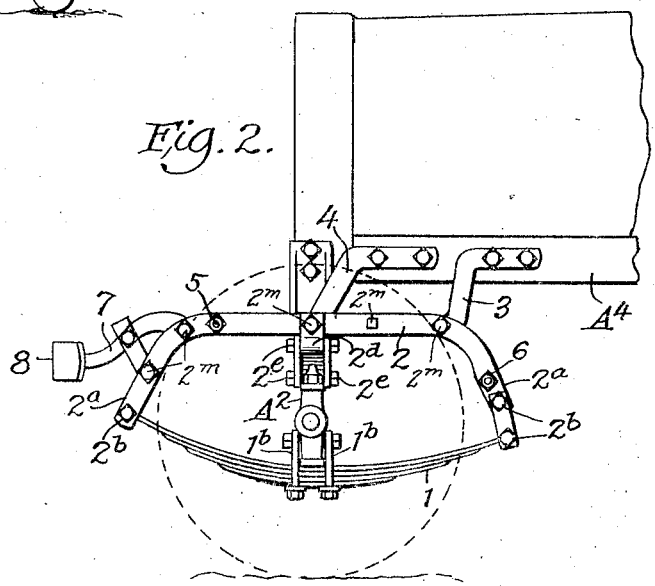
Figure 2 is a side elevation thereof, the front wheel at the near side being omitted to more clearly reveal the arrangement of parts.

Preferably guide braces 3 engage the rear ends of members 2 and are fastened to the frame $A^4$ of the vehicle, as shown in Figure 2, and preferably guide braces 4 engage the members 2 adjacent straps $2^d$, and are fastened to the frame $A^4$ of the vehicle to maintain the members 2 parallel with the longitudinal axis of the vehicle. Preferably transverse tie-rods 5 and 6 connect the front and rear ends respectively of the members 2 in order to further stiffen the same with respect to each other and with the frame $A^4$.

At the outer ends of the members 2 are clips 7 securely bolted thereto, the outer ends of said clips being flanged as at $7^a$, and perforated to receive the usual bumper 8 at the front end of the vehicle.

If desired, a radius rod 9 may be used, said radius rod 9 having one end $9^a$ pivoted in a bearing A' on the axle A², and the other end connected to the transverse spring A by means of a suitable bracket 9ᵇ, as shown in Figure 1. The radius rod 9 however may be omitted.

Each member 2 may be forged or cast in one piece, or may comprise a plurality of laminations securely connected together by means of bolts 2ᵐ as shown in Figs. 2 and 4, or by rivets, or the like.

The spring construction at the rear of the machine (Figure 3) is substantially identical with that at the front end thereof, the rear transverse spring A¹⁰ of the vehicle being disconnected from its bearings on the rear axle A¹¹ and shackled to the member 2 of semi-elliptic springs 1, 2, in the same manner as previously described. Tie-rods 5 and 6 securely tie the members 2 together, and braces 13 and 14 connect the rear ends of members 2 to a trunk platform A¹² at the rear end of the vehicle body to maintain the members 2 in proper alignment. Also radius rods (not shown) similar to those at the front end of the vehicle may be also used if desired.

My invention provides simple, efficient, attachable springs adapted to be compounded with the usual transverse semi-elliptic spring of a Ford automobile without alteration of the parts of the vehicle, and enhancing the riding qualities thereof.

I do not limit my invention to the exact form shown in the drawings, for obviously changes may be made in the details of construction within the scope of the claims.

I claim:

1. In combination with an axled vehicle having transverse semi-elliptical body springs parallel with and overlying the axles; pairs of longitudinally disposed semi-elliptic springs mounted on said axles below the ends of said body springs; tie-rods connecting the springs of each pair; means for connecting the ends of each body spring to the adjacent semi-elliptic spring, whereby the body springs will be compounded with the semi-elliptic springs; and guide braces on the vehicle body slidably engaging the semi-elliptic springs to maintain the latter parallel with the longitudinal axis of the vehicle.

2. In combination with an axled vehicle having a transverse semi-elliptical body spring parallel with and overlying the axle; a pair of longitudinally disposed semi-elliptic springs underslung from said axle below the ends of said body spring; tie-rods connecting the springs of said pairs; means for connecting each end of the body spring to the adjacent semi-elliptic spring, whereby the body spring will be compounded with the semi-elliptic springs; and guide braces on the vehicle body slidably engaging the semi-elliptic springs to maintain the latter parallel with the longitudinal axis of the vehicle.

3. In combination with an axled vehicle having transverse semi-elliptical body springs parallel with and overlying the axles; pairs of longitudinally disposed semi-elliptic springs underslung from said axles below the ends of said body springs; tie-rods connecting the springs of each pair; radius rods connecting the transverse springs with the vehicle axles; means for connecting the ends of each body spring to the adjacent semi-elliptic springs, whereby the body springs will be compounded with the semi-elliptic springs; and guide braces on the vehicle body slidably engaging the semi-elliptic springs to maintain the latter parallel with the longitudinal axis of the vehicle.

In testimony that I claim the foregoing as my own, I affix my signature.

AUSTIN DANCY.